| United States Patent [19] | [11] Patent Number: 4,901,402 |
|---|---|
| Begemann | [45] Date of Patent: Feb. 20, 1990 |

[54] CLAMPING DEVICE

[76] Inventor: Malcolm J. S. Begemann, Biesdelselaan 12A, 6881 CG Velp, Netherlands

[21] Appl. No.: 321,785

[22] Filed: Mar. 10, 1989

[51] Int. Cl.[4] .............................................. A44B 21/00
[52] U.S. Cl. .................................. 24/129 D; 24/545; 248/231.6
[58] Field of Search ...................... 248/74.1, 74.2, 125, 248/218.4, 225.31, 230, 231.6, 231.8, 295.1, 296, 316.1, 316.7, 359 F; 24/129 D, 129 R, 30.55, 545, 535

[56] References Cited

U.S. PATENT DOCUMENTS

| 1,928,536 | 9/1933 | Heinlen | 24/545 |
| 2,783,515 | 3/1957 | Tobias | 24/545 |
| 3,043,902 | 7/1962 | Klein | 24/129 D |
| 3,170,213 | 2/1965 | Thomas | 24/30.5 S |
| 4,357,740 | 11/1982 | Brown | 24/30.5 S |
| 4,470,180 | 9/1984 | Blomgren | 24/30.5 S |
| 4,646,394 | 3/1987 | Krauss | 24/129 D |
| 4,697,312 | 10/1987 | Freyer | 24/30.5 S |

FOREIGN PATENT DOCUMENTS

| 115669 | 8/1942 | United Kingdom | 24/129 D |
| 2016579 | 9/1979 | United Kingdom | 24/129 R |

*Primary Examiner*—Ramon O. Ramirez
*Assistant Examiner*—Robert A. Olson
*Attorney, Agent, or Firm*—Woodcock, Washburn, Kurtz, Mackiewicz & Norris

[57] ABSTRACT

A clamping device for clamping onto a support element, the device being made of a semi-rigid material having a high coefficient of elasticity and preferably in the form of a unitary piece. The device has a peripheral portion with a geometry such as a parallelogram whereby when pressure is applied from opposite sides along the shorter axis the device expands along its longer axis. A pair of fingers are formed extending lengthwise along the longer axis, to provide gripping surfaces at about the center of the device, whereby the applied pressure moves the gripping surfaces away from the support element, and release of such pressure results in their returning into a gripping condition.

13 Claims, 2 Drawing Sheets

4,901,402

CLAMPING DEVICE

FIELD OF THE INVENTION

This invention relates to clamping devices and, in particular, to a clamping device that does not require bolts, screws or other such mechanisms, and which can be manufactured as a single unitary piece.

BACKGROUND OF THE INVENTION

There has long been an ongoing need for clamping devices, whereby an object can be clamped onto another support element such as a verticle pole. There are many uses for such clamping devices, including providing work space, holding lamps, etc. Such clamping devices generally require the use of a set screw or similar mechanism, meaning that the clamp itself must be made of different parts and that a tool such as a screw driver must be used for installation of the clamp. Also, known clamps frequently provide relatively little mechanical advantage, i.e., the clamping force applied is relatively small compared to the operator force exerted in placing the clamp onto the support element. There is thus a long-felt and longstanding need for an improved clamp which is simple to make, provides a good mechanical advantage, and which is easily manipulated.

SUMMARY OF THE INVENTION

It is an object of this invention to provide an improved clamping device which can be easily utilized by a simple manual application of pressure on one or both of the sides of the device.

It is another object of this invention to provide an improved clamp which does not require the use of a set screw, spring or like auxiliary piece, and does not require the use of any tools for installation or movement.

It is another object of this invention to provide a clamping device that can be easily manufactured as a unitary piece.

It is another object of this invention to provide a clamping device which provides the user a high mechanical leverage, and is thus easily manipulable.

It is a still further object of this invention to provide a clamping device which is easily manipulable and has integrally connected thereto a carrier portion.

In view of the above objects, there is provided a clamping device for clamping onto a support element, the device being made preferably of a semi-rigid material having a high coefficient of elasticity and being a unitary piece of such material, the piece being formed to have a peripheral portion with a parallelogram or like geometry and an inner-extending gripping portion which extends inwardly from the peripheral portion and which is aligned substantially lengthwise parallel to the peripheral portion, the gripping portion providing at least two gripping surfaces. In use, when the operator applies pressure against the two longer sides, such that the pressure is applied substantially perpendicular to the length of the clamping device, the gripping surfaces are moved outwardly to permit a support element to be adjusted therebetween, while the release of such said pressure results in the gripping surfaces retracting into clamping contact with the support element.

DESCRIPTION OF THE PREFERRED EMBODIMENT

The general principle of this invention is based upon the geometrical phenomenon that if two opposite corners of an equilateral parallelogram are pushed toward each other, the other two corners are driven away from each other. The same general principle adheres to other geometries which are substantially parallelograms, or quasi-parallelograms. Thus, for an ellipse, or a two-dimensional geometry having substantially a major axis and a minor axis, if pressure is applied inwardly from both sides in a direction perpendicular to the major axis, so as to reduce the minor axis, then the dimension along the major axis is increased. Considering an element made of a semi-rigid but elastic material, and formed with such a geometry, applied pressure from both sides along the minor axis causes an outward expansion along the major axis, a reactive force to the applied pressure obtained by using a semi-rigid material with a high coefficient of elasticity. When the pushing force is discontinued, the elastic property causes the device to try to regain its initial shape, thereby exercising an inward force on any object which obstructs or constrains its attempt to regain its original shape.

Figure 1:
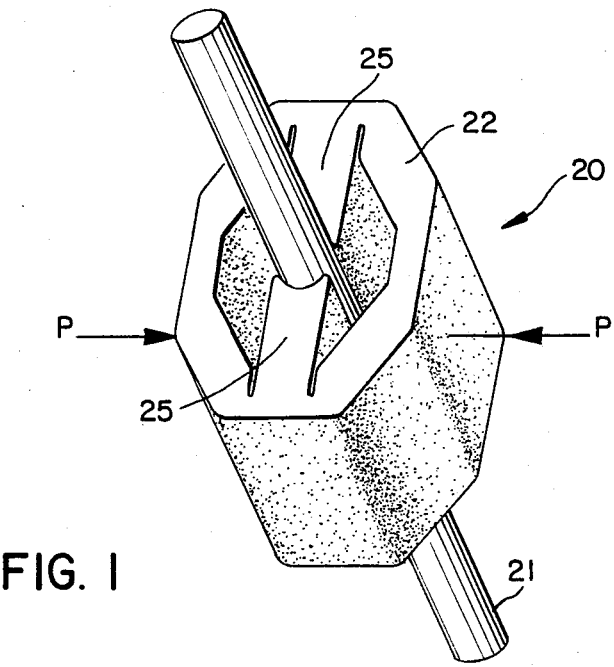
FIG. 1 is a perspective view of a unitary clamping device in accordance with this invention.
Figure 2:
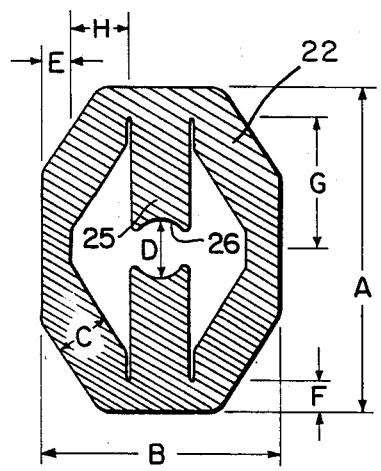
FIG. 2 is a cross-sectional view of the clamping device illustrated in FIG. 1.

Referring to FIGS. 1 and 2, it is seen that the clamping device 20 has a substantially parallelogram geometry, adapted so that operator pressure is applied substantially along the minor axis, as indicated by the arrows labelled P. As shown in FIG. 1, the clamping device surrounds a support element such as a pole 21 (shown in phantom) which runs through the middle thereof. The outer periphery 22 of the cross-section of the clamping device is, as seen, substantially a parallelogram. Fingers 25 extend from the ends (i.e. the sides along the major axis) inwardly to form surfaces 26 designed to mate with the outer surface of the support element 21. When pressure is applied along the minor axis, as indicated, the fingers 25 are forced outwardly, releasing the pressure between the surfaces 26 and the support element 21. When the pressure P is relaxed, the length along the major axis returns due to the elasticity of the material, bringing the fingers and surfaces 26 back into clamping engagement with the support element 21. In practice the clamp is initially applied by sliding it onto an open end of element 21, and it can be loosened for adjustment to any position by simply applying the force as indicated at P. It is to be noted that adjustment can include rotation of the clamp body relative to the support element, as well as up and down movement.

In the preferred embodiment, the dimensions of the cross-section are important, as well as the peripheral geometry. For example, the thickness of the peripheral portion as indicated at C, should be greater than the thicknesses indicated at E and F, in order to achieve well-defined hinging points. The amount of force to be exercised is proportional to the rigidity of the material and the thicknesses E and F. The ratio of force exercised by the operator ($F_o$) to the clamping force ($F_c$) is approximately equal to the ratio between the distances H and G, or to the ratio to the minor axis to the major axis. This ratio can, of course, be designed as desired.

Figure 3A:
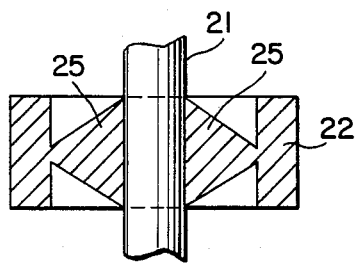
FIG. 3A is a diagrammatic cross-section of the clamping device in accordance with this invention which permits movement of the device relative to a support rod with substantially equal ease in each direction.
Figure 3B:
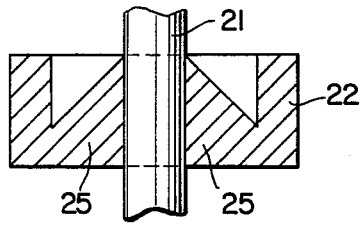
FIG. 3B is a diagrammatic cross-section of the clamping device of this invention which is designed to present higher resistance to upward movement relative to the support rod compared to downward movement.
Figure 3C:
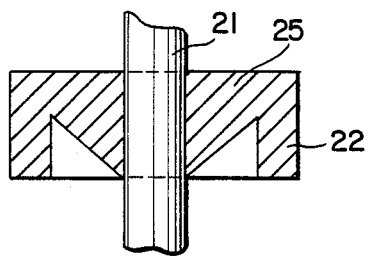
FIG. 3C is a diagrammatic cross-section of the clamping device of this invention which is designed to present higher resistance to downward movement relative to the support rod compared to upward movement.

Referring to FIGS. 3A, 3B and 3C, there are shown diagrammatic cross-sections indicating design configurations of the fingers 25, to achieve a symmetrical or asymmetrical ability to move the clamp in different directions along the pole 21. As shown in FIG. 3A, each finger 25 is flanged inwardly in both the up and down directions, such that the resistance to movement up is the same as the resistance to movement down. In FIG. 3B, fingers 25 are designed to present higher resistance to upward movement, whereas in FIG. 3C the fingers are designed to present higher resistance to downward movement. Likewise, the clamp can be adapted for asymmetrical rotation around the support element.

Figure 4:
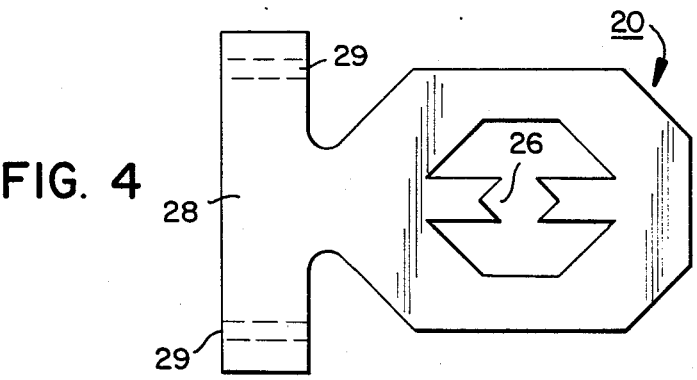
FIG. 4 is a diagrammatic cross-section of a molded integral clamp and carrier element in accordance with this invention.

Referring to FIG. 4, there is shown a diagrammatic cross-section of a unitary piece fabricated to present both a clamp portion 20 and a carrier portion 28. As shown, the carrier portion 28 is integral with the clamp portion 20, and may be constructed by molding a unitary piece. Holes 29 are suitably formed in carrier 28, for bolts or other attachment means. As indicated, the clamping or gripping surfaces 26 may be of any geometry which mates to the support element, i.e. a square as shown, or any other geometry.

In construction of the device, the clamping piece may be made of polycarbonate, different types of steel, etc. Further, a length of the material may be molded or otherwise extruded, and then sliced to provide a plurality of devices having the cross-section as shown in FIG. 3C, or any other desired cross-section within the scope of the invention. While in the preferred embodiment the clamping device is a unitary piece, in another embodiment the fingers can be of a different material, or may have a different material at the gripping surface 26. Additionally, fingers 25 may be extensible so as to vary the distance D between gripping surfaces 26, to adapt to support elements of different cross-sectional dimensions.

There has thus been illustrated an improved clamp that has many uses, e.g., for attaching to the vertical piping as in a shower installation. In the preferred embodiment as described pressure is applied to opposite ones of the sides parallel to the major axis of the clamp, i.e., from opposite directions along the minor axis. The clamp can also be formed with only one pressure side. If a heavy item is to be supported on one side of the clamp, there may be added a counter element which braces against the support element, to prevent skewing or rotating of the clamp relative to the support element.

I claim:

1. A clamping device for clamping onto a support element made at least in part of a semi-rigid material having a high coefficient of elasticity, comprising:
   a. a unitary piece of said material;
   b. said piece of material having a peripheral portion with a geometry defining a length bounded by respective ends and a width bounded by respective sides;
   c. said piece of material having a gripping portion extending inward from said peripheral portion and being aligned substantially lengthwise relative to said peripheral portion; and
   said gripping portion having at least two gripping surfaces for gripping a said support element, each said gripping element extending inwardly from a respective location of said peripheral portion and presenting a convex gripping surface toward the other of said gripping elements, said two surfaces defining a space adapted to normally receive a said support element; and
   said side being reduced in cross sectional thickness at about the centers thereof,
   whereby pressure applied to said sides causes outward movement of said gripping surfaces to disengage a said support element, while the lack of such side pressure results in said gripping surfaces being in position for clamping contact with a said support element.

2. The device of claim 1, wherein said two elements extend inwardly from opposed ones of said ends, said elements being aligned substantially lengthwise along the center axis of said piece of material.

3. The device of claim 1, wherein said peripheral portion geometry is substantially a parallelogram.

4. The device of claim 1, wherein said peripheral portion geometry defines a major axis and a minor axis, said gripping portion is aligned substantially along said major axis and said gripping surfaces define an opening about in the center of said piece, and the ratio of operator force applied to said sides to the clamping force is determined by the ratio of said major axis to said minor axis.

5. The device of claim 1, wherein said piece comprises a carrier portion integrally connected thereto, said carrier portion having attachment means for attaching an object thereto.

6. The device of claim 1, wherein said gripping portion comprises means for providing higher resistance to movement of said piece in one direction along the surface of said support element than in the opposite direction.

7. The device of claim 1, wherein said piece contains polycarbonate.

8. The device of claim 1, wherein said piece contains steel.

9. The device of claim 1, wherein said gripping surfaces define an opening for receiving a said support element, and said gripping portion comprises means for adapting the size of said opening.

10. The device of claim 1, wherein said gripping surfaces define an opening for receiving a said support element, and said gripping portion comprises means for adapting the contour of said gripping surfaces.

11. Clamping device for clamping onto a support element comprising:
   a. a unitary piece of material having a high coefficient of elasticity;
   b. said piece of material being formed to have a portion with geometry which defines a major axis and a minor axis, whereby external pressure applied inwardly and substantially perpendicular to said major axis causes elastic outward movement of said piece substantially along said minor axis;

c. said piece having fingers extending substantially along said major axis and connected to said portion substantially adjacent opposite ends of said major axis;

d. said fingers defining substantially convex clamping surfaces at the inner ends thereof, said surfaces being separated by a predetermined distance to define a receiving space; and e. said portion having a pressure side with a reduced thickness opposite said receiving space for receiving side external pressure.

12. The clamping device as described in claim 11, wherein said piece comprises a semi-rigid material and said portion has a substantially parallelogram geometry, whereby the ratio of clamping pressure exerted by said clamping surfaces to said external pressure applied by an operator is substantially defined by the ratio of said major axis to said minor axis.

13. The clamping device as described in claim 11, wherein said portion has opposed pressure sides for receiving said external pressure.

* * * * *